Figure 1:
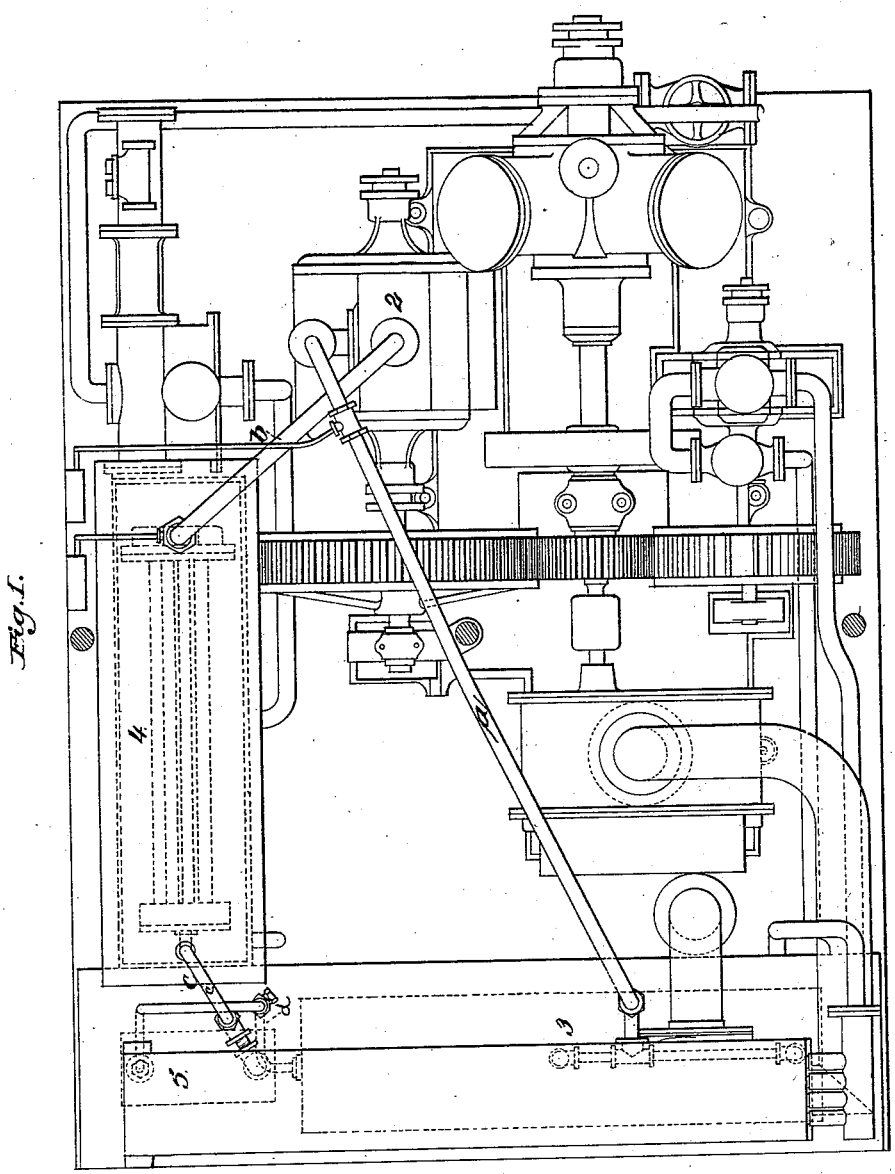

2 Sheets—Sheet 1.

J. GAMGEE.
Ice-Machine.

No. 208,305. Patented Sept. 24, 1878.

Attest:
Joseph J. Stewart
Jno. J. Pickett

Inventor:
John Gamgee

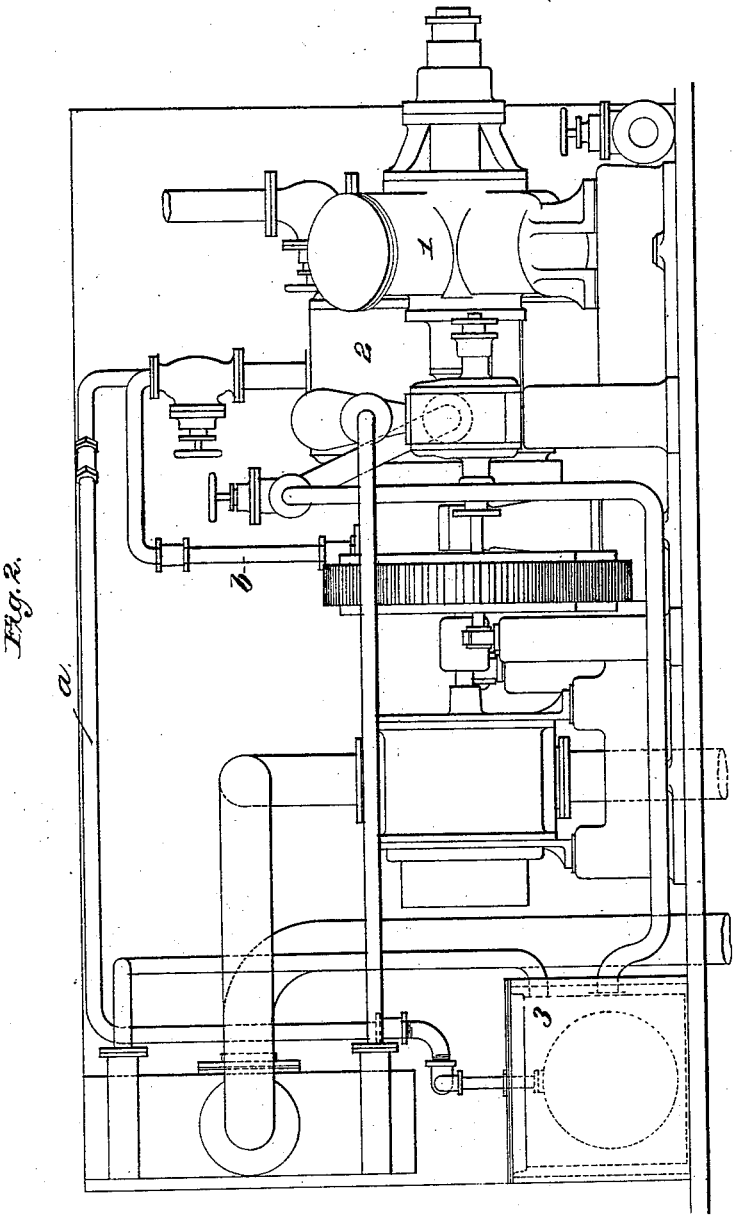

UNITED STATES PATENT OFFICE.

JOHN GAMGEE, OF CHELSEA, ENGLAND.

IMPROVEMENT IN ICE-MACHINES.

Specification forming part of Letters Patent No. 208,305, dated September 24, 1878; application filed October 18, 1877.

*To all whom it may concern:*

Be it known that I, JOHN GAMGEE, of Chelsea, in the county of Middlesex, England, now residing in the city of Washington, in the District of Columbia, have invented certain new and useful Improvements in Ice-Making Machines and Freezing-Liquids; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to the construction of refrigerators or ice-making machinery in which chemicals are commonly condensed from the gaseous to the liquid state under high pressure.

Heretofore such agents as ammonia and methylic ether have been used in forms of apparatus under conditions which entail great waste and wear and tear. The first has been employed mainly in machines in which it is alternately combined with and freed from water. It has also been used in its anhydrous state by means of an ordinary cylindrical compressor with refrigerator and condenser, as generally employed for working ether or sulphurous acid. The pressure in the condenser in ammonia-machines of this construction usually attains one hundred and fifty pounds to two hundred pounds to the square inch, according to the temperature of the condensing water, and, when in continuous operation, the chemical is wasted and leakages are of constant occurrence.

The object of my invention is to take advantage of the properties of ammonia while always controlling the pressure at which it is condensed. Thus gaseous ammonia is liquefied at °0 centigrade under a pressure of 4.44 atmospheres, whereas at °28.31 centigrade the pressure required amounts to ten atmospheres. I cool the partially-condensed ammonia by a current of water at ordinary temperatures, and then pass it through a small supplementary condenser, through which an uncongealable liquid, at or below °0 centigrade, is made to flow, and thus avoid the excessive pressure referred to.

In order to prevent loss of gases of extreme tenuity, such as ammonia, instead of a piston-pump as a compressor, I use a rotary pump on the system adopted by Mr. W. E. Sudlow, whereby a continuous motion is obtained with certainty of action and a complete closure of the circuit of my apparatus.

The parts of my apparatus consist in the rotary compressor, an iron tubular vessel or first condenser, into which gaseous ammonia is forced and cooled by a current of water at ordinary temperature through the tubes. From this condenser the flow of the ammonia is regulated by a cock into a second and much smaller condenser, in which the temperature is kept below °0 centigrade, and this regulates the pressure required for liquefaction. The liquid then passes into a capacious tubular vessel or refrigerator, where it vaporizes, and onto the compressor, its tension being from two to three atmospheres. Thus the force expended in liquefaction is the difference between the two and a half to three atmospheres pressure on the suction side of the pump and the four or five atmospheres on the condenser side; and once the machine is started, the cold liquid returning from the ice-making apparatus or cooling-chamber to the refrigerator regulates the pressure at a minimum cost, according to the temperature of the condensing water that is available wherever the machine is worked.

The essential parts of my machine are represented by the accompanying drawing.

1 is a form of cylinder-engine which may be replaced by a rotary or common cylinder-engine driving a rotary compressor, 2, which sucks, by a pipe, *a*, the gas arising from the liquid ammonia or chloride of methyl in the refrigerator 3. That vapor passes through the tube *b* into my compound tubular condenser 4, and, being there cooled by a flow of cold water, the condensed vapor passes in a condition approaching liquefaction through the tube *c* to the supplementary condenser 5, maintained at a low temperature, so as to cause liquefaction at moderate pressure. The liquid ammonia or chloride of methyl thus flows through the pipe *a* to the tubular refrigerator, again to return in its course through the pump.

In order to secure the advantage of low-pressure machines in which gases are used liquefying at the highest pressures known—such, for instance, as protoxide of nitrogen or carbonic acid—I may cool my supplementary condenser by a machine in which liquids condensed at low pressure may be employed. This I call using machines in a cycle, and thus I obtain very low temperature at moderate cost and by means of machinery of the most compact kind.

Thus a small sulphurous-acid machine might be used to cool the ammonia in a supplementary condenser, 5; and, again, the cold generated in the refrigerator of the ammonia-machines may be used to condense carbonic acid.

Having described the construction and operation of my invention, what I claim as new, and desire to secure by Letters Patent, is—

1. A refrigerating apparatus in which gases are condensed at very low temperature and by pressure, which consists of a compressing-pump, a main condenser to receive the gas therefrom, and a supplementary condenser, into which the condensed vapor passes in a condition approaching liquefaction, said supplementary condenser being maintained at a low temperature, so as to cause liquefaction at moderate pressure, substantially as shown and described.

2. The process of fractional condensation, utilizing each refrigerant for the condensation of the succeeding one, having a lower point of condensation, which consists in passing the refrigerant gas from a main condenser in a state approaching liquefaction into a supplementary condenser cooled by a gas or gases condensable at low pressure, substantially as set forth and described.

In testimony that I claim the foregoing as my own I affix my signature in presence of two witnesses.

JOHN GAMGEE.

Witnesses:
 JOSEPH J. STEWART,
 JNO. T. PICKETT.